United States Patent
Chu

(10) Patent No.: US 7,318,404 B1
(45) Date of Patent: Jan. 15, 2008

(54) PISTON ENGINE

(76) Inventor: Hsin-Ping Chu, No. 33-1, Lincuo Rd., Liuqiu Village, Daliao Hsiang, Kaohsiung Hsien (TW)

( * ) Notice: Subject to any disclaimer, the term of this patent is extended or adjusted under 35 U.S.C. 154(b) by 5 days.

(21) Appl. No.: 11/494,653

(22) Filed: Jul. 27, 2006

(51) Int. Cl.
*F02B 75/06* (2006.01)

(52) U.S. Cl. ............ 123/192.1; 123/78 E; 123/195 R; 123/195 H; 74/603; 180/298

(58) Field of Classification Search ............ 123/192.1, 123/193.1, 193.2, 78 E, 78 F, 195 R, 195 S, 123/195 H; 74/603; 180/298
See application file for complete search history.

(56) References Cited

U.S. PATENT DOCUMENTS

| | | | | |
|---|---|---|---|---|
| 2,047,419 A | * | 7/1936 | Lee ............................. | 74/603 |
| 2,169,236 A | * | 8/1939 | Frazier ..................... | 123/73 R |
| 5,131,357 A | * | 7/1992 | Inoue et al. ............. | 123/41.74 |
| 6,647,944 B2 | * | 11/2003 | Kamiya ................... | 123/195 R |
| 2004/0187636 A1 | * | 9/2004 | Gokan ........................ | 74/596 |

* cited by examiner

*Primary Examiner*—Stephen K. Cronin
*Assistant Examiner*—Katrina Harris
(74) *Attorney, Agent, or Firm*—Willaim E. Pelton, Esq.; Cooper & Dunham LLP

(57) ABSTRACT

A piston engine has a crank assembly, a piston assembly, a crank case assembly and a cylinder head assembly. The crank assembly has a central axle, two counterweight blocks and a crank axle. The central axle has two connecting segments and two flanges. The flanges are respectively coaxial and eccentric mounted with the connecting segments and each flange has an eccentricity h relative to a corresponding connecting segment. Accordingly, the eccentricity h can make the crank case assembly and the cylinder head assembly vibrate. The vibration directions of the cylinder head assembly and the crank case assembly opposite to the vibration directions of the piston assembly and the crank assembly. Then, the shaking and the vibration of the piston engine can be effectively reducing.

10 Claims, 3 Drawing Sheets

PISTON ENGINE

BACKGROUND OF THE INVENTION

1. Field of the Invention

The present invention relates to a piston engine, and more particularly relates to a piston engine for effectively reducing vibration.

2. Description of Related Art

A conventional piston engine always makes violent vibration due to reciprocal movement of pistons. The engineer can use four or more cylinders by arranging with alternative phases to reduce the violent vibration inherently of the piston engine. However, the conventional piston engine with multiple cylinders has several defects and shortcomings such as a complicated structure, expensive and a huge volume.

In additional, a balance shaft is arranged on a conventional piston engine to solve the violent vibration problem but has a limited efficiency. Two balance shafts mounted on two symmetrical sides of a crank are always needs to effectively reduce the vibration of a conventional piston engine but increases the volume of and the cost of manufacturing the conventional piston engine and may interfere with another components of the conventional piston engine, such as a driving device, a clutch or a gearbox during operation and the cost of arranging balance shafts on a conventional piston engine is high.

Furthermore, a suspension device is arranged on a conventional piston engine to separate the piston engine from a vehicle frame and to keep the violent vibration of the cylinders from transmitting to the vehicle frame.

A conventional piston engine with a single cylinder substantially comprises a piston assembly and a crank assembly. The piston assembly has a piston, a connecting rod, a piston pin and optional multiple piston rings. The piston can be a jacket and has a closed end and an open end. The connecting rod is extended into the piston and has a proximal end and a distal end. The piston pin is transversely mounted in the proximal end of the connecting rod. The motion of the piston assembly is reciprocal and the change of speed and acceleration of the conventional piston assembly is complicated. The inertia force of the piston assembly can be represent as $A(\theta)=A_1\omega^2 \cos\theta + A_2\omega^2 \cos 2\theta + \ldots$, wherein the $\theta$ is the angle of the crank, the $A_1$ called as first inertia, and the $A_2$ called as second inertia and so on. The value of the $A_1$ can be represent as $M_p s/2$, wherein $M_p$ is piston assembly mass and s is piston stroke.

The crank assembly is attached pivotally to the piston assembly and has a body, two counterweight blocks and multiple bearings. The body of the crank assembly is mounted with the distal end of the connecting rod of the piston assembly. The counterweight blocks are mounted around the body and abut the distal end of the connecting rod. The rotating unbalance force of the crank assembly can be presented as $Mrw^2$, wherein, M is eccentric mass, r is eccentric distance, w is rotating speed. Usually, the engineers discuss the vibration by the moment that is represent as Mr.

A ratio of the rotating unbalance force of the crank assembly over the inertia force of the piston assembly is provided to project the balance of the conventional piston engine.

Therefore, the invention provides a piston engine to mitigate or obviate the aforementioned problems.

SUMMARY OF THE INVENTION

The main objective of the present invention is to provide a piston engine that can reduce the shaking and the vibration easily and effectively in use.

The piston engine has a crank assembly, a piston assembly, a crank case assembly and a cylinder head assembly. The crank assembly has a central axle two counterweight blocks and a crank axle. The central axle has two connecting segments and two flanges. Both connecting segments and flanges are bearing contact surface. The connecting segments that extend out from the piston engine into the frame and the gearbox, are rotatably mounted in the frame and the gearbox, and are the connecting points between the piston engine and the frame. The flanges are coaxial and eccentric mounted with the connecting segments respectively and each flange has an eccentricity h relative to a corresponding connecting segment. The crank case is mounted on the flanges. When the crank shaft rotate, the eccentricity h can make the crank case assembly and the cylinder head assembly vibrate. The vibration directions of the cylinder head assembly and the crank case assembly are opposite to the vibration directions of the piston assembly and the crank assembly. Then, the shaking and the vibration of the piston engine can be reducing.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
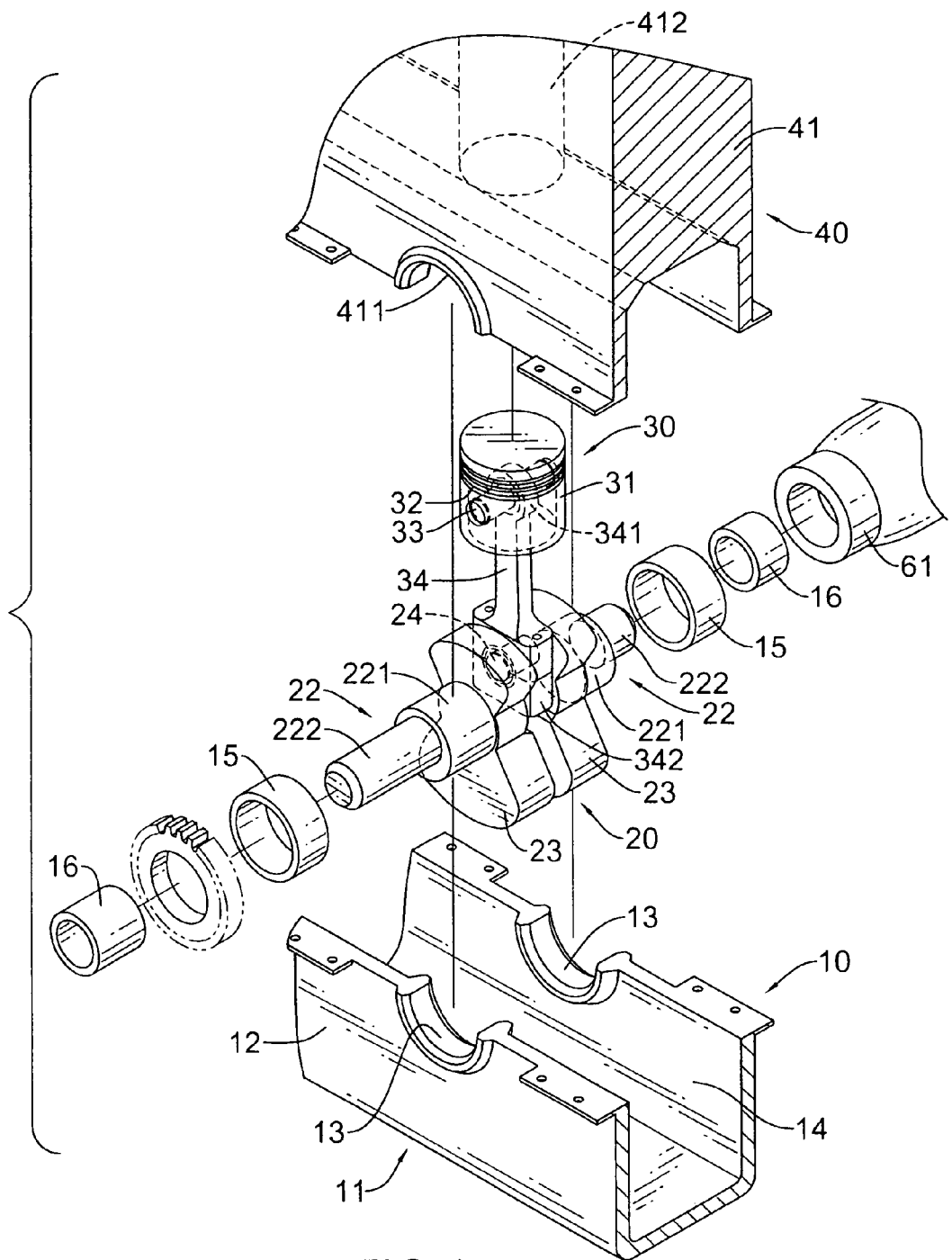
FIG. 1 is an exploded perspective view of a piston engine in accordance with the present invention.
Figure 2:
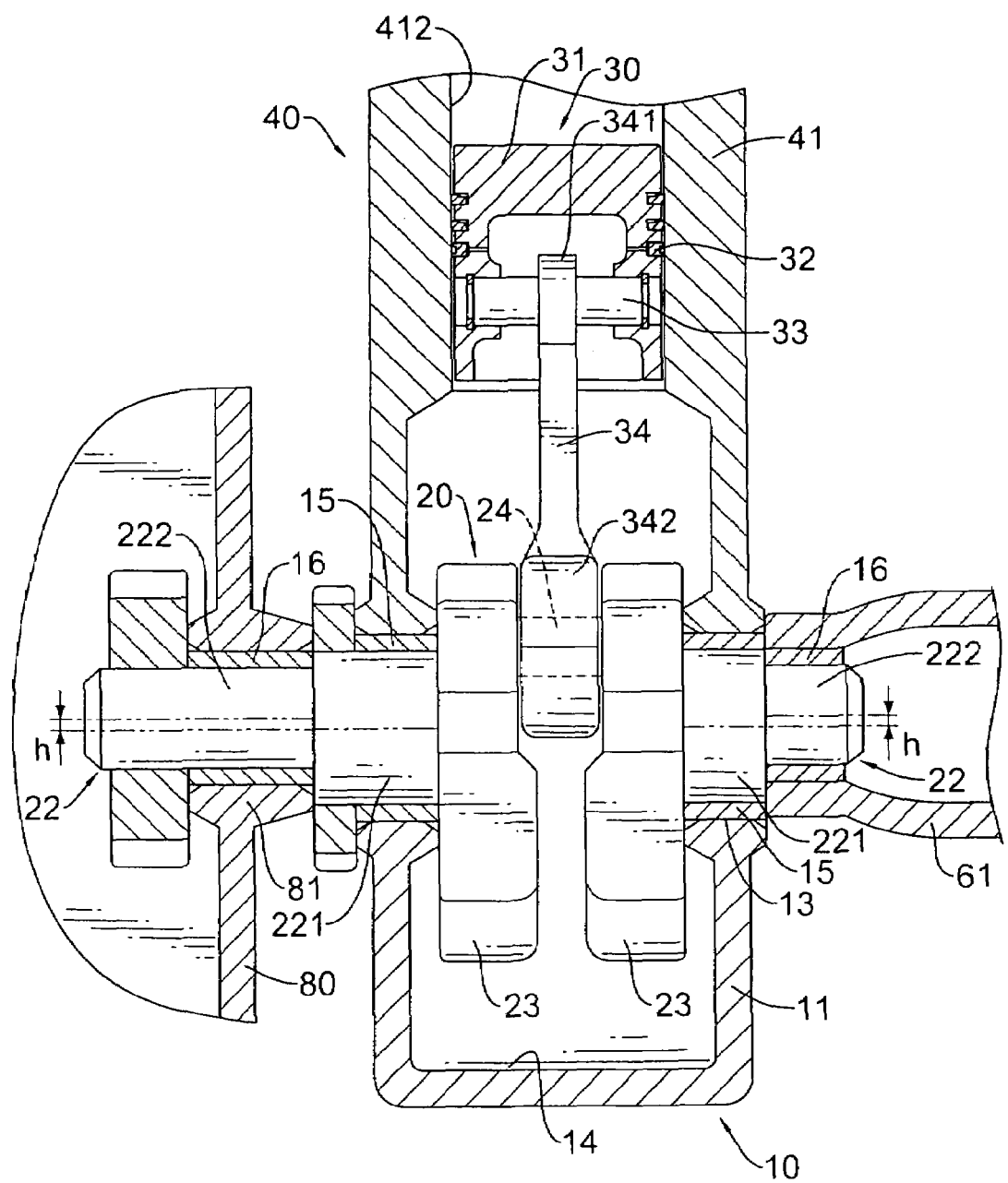
FIG. 2 is a side view in partial section of the piston engine in FIG. 1.
Figure 3:
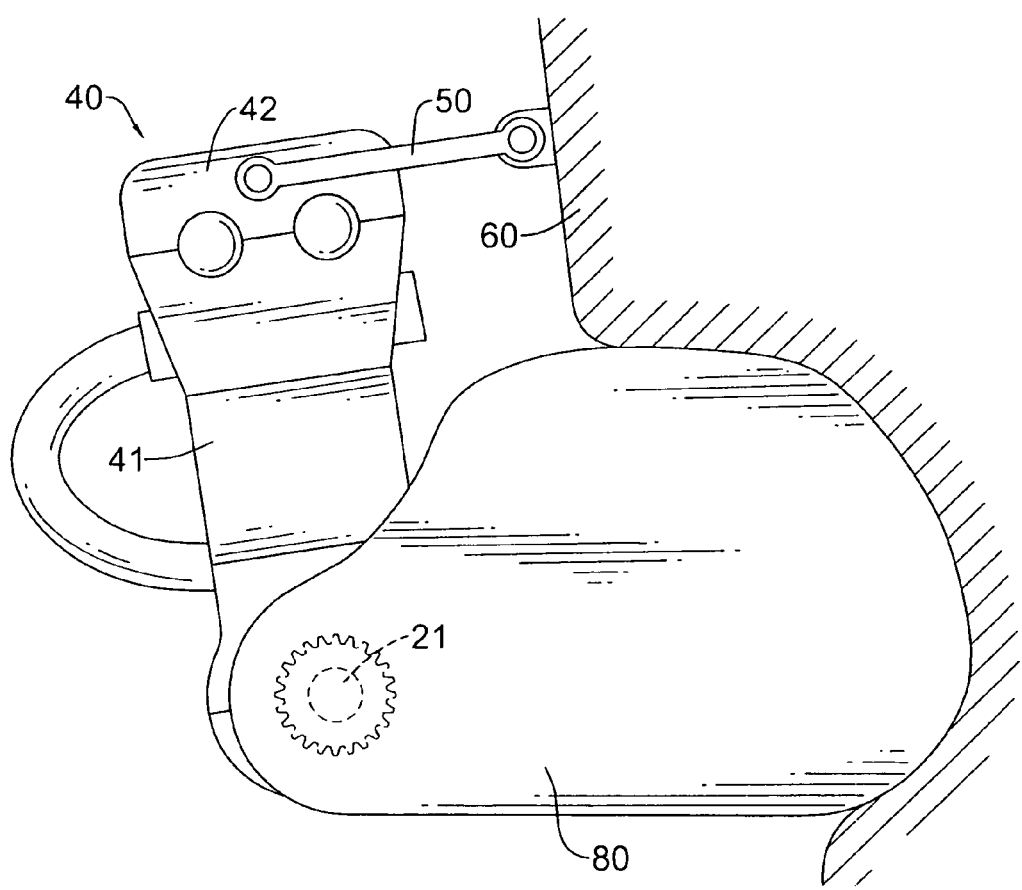
FIG. 3 is an operational side view in partial section of the piston engine in FIG. 1 mounted on a frame.

With reference to FIGS. 1 to 3, a piston engine in accordance with the present invention is used on a frame (60) having a mounting bracket (61), a gearbox (80) and a swing shaft (50), and the piston engine comprises a crank assembly (20), a piston assembly (30), a crank case assembly (10) and a cylinder head assembly (40).

With reference to FIGS. 2 and 3, the mounting bracket (61) is mounted on and protruded from the frame (60) and may be a sheath. The gearbox (80) is mounted with the frame (60) and has a holding bracket (81). The holding bracket (81) is protruded from the gearbox (80) and faces the mounting bracket (61).

With reference to FIG. 3, the swing shaft (50) is mounted with the frame (60) and has a rear end and a front end. The rear end of the swing shaft (50) is mounted on the frame (60). The front end of the swing shaft (50) is mounted with the cylinder head assembly (40). The direction of the swing shaft (50) is perpendicular to the direction of the cylinder to provide that the cylinder head assembly (40) will vibrate in the same but opposite direction of the piston.

With reference to FIGS. 2 and 3, the crank assembly (20) is attached rotatably between the mounting bracket (61) and the holding bracket (81) and has an central axle (22), two counterweight blocks (23) and a crank axle (24).

The central axle (22) is attached to the mounting bracket (61) and the holding bracket (81) and has two connecting segments (222) and two flanges (221). The connecting segments (222) are used to fix the piston engine to the frame and one of the connecting segments (222) is attached in the holding bracket (81) and extends into the gearbox (80), and the other connecting segment (222) is attached in the mounting bracket (61) of the frame (60). The flanges (221) of the central axle (22) are coaxial but eccentric mounted with the connecting segments (222) respectively, are bearing contact surface that are used to connect the crank case assembly (10) on the crank assembly (20). One of the flanges (221) abuts with the holding bracket (81) and the other flange (221) abuts with the mounting bracket (61) of the frame (60). Each flange (221) has an eccentricity h relative to a corresponding connecting segment (222).

The counterweight blocks (23) of the crank assembly (20) are mounted securely on the central axle (22) and each has an outer surface and an inner surface. The outer surfaces of the counterweight blocks (23) contact respectively with the flanges (221) at sides opposite to the connecting segments (222). The inner surfaces of the counterweight blocks (23) face each other.

The crank axle (24) is mounted transversely between the inner surfaces of the counterweight blocks (23).

The piston assembly (30) is connected with the crank assembly (20) and has a piston rod (34), a piston pin (33), a piston (31) and optional multiple piston rings (32).

The piston rod (34) is mounted on the crank axle (24) and has a distal end (342), a proximal end (341) and two optional mounting holes. The mounting holes are respectively formed through the distal end (342) and the proximal end (341) of the piston rod (34). The distal end (342) is mounted around the crank axle (24) between the counterweight blocks (23) with the crank axle (24) extending through the mounting hole in the distal end (342).

The piston pin (33) is mounted transversely on the proximal end (341) of the piston rod (34) and extends through the mounting hole in the proximal end (341).

The piston (31) is mounted around the proximal end (341) of the piston rod (34), is attached securely to the piston pin (33), can be a sheath and has an outer surface.

The piston rings (32) are separately mounted around the outer surface of the piston (31).

The crank case assembly (10) is attached with the crank assembly (20) and has a body (11), two optional first bearings (15) and two optional second bearings (16).

The body (11) is U shaped, is attached to the central axle (22) of the crank assembly (20) and has two side walls (12), two mounting grooves (13) and a chamber (14). The side walls (12) are formed and protruded up from the body (11) and are parallel each other. The mounting grooves (13) are semicircular and respectively formed in the side walls (12), face to each other and hold the flanges (221) of the central axle (22) inside. The chamber (14) is formed between the side walls (12) and holds the counterweight blocks (23) inside.

The first bearings (15) are respectively mounted around the flanges (221) of the central axle (22) and are held respectively in the mounting grooves (13) in the body (11) of the crank case assembly (10).

The second bearings (16) are respectively mounted around the connecting segments (222) of the central axle (22), one of the second bearings (16) is mounted in the mounting bracket (61) of the frame (60) and the other second bearing (16) is mounted in the holding bracket (81) of the gearbox (80).

With further reference to FIGS. 1 to 3, the cylinder head assembly (40) is combined with the crank case assembly (10) to hold the crank assembly (20) and the piston assembly (30) inside, is connected to the swing shaft (50) of the frame (60), and has a cylinder housing (41) and a cylinder head (42). The cylinder housing (41) is combined with the body (11) of the crank case assembly (10) and has two side walls, two mounting grooves (411) and a piston channel (412).

The side walls of the cylinder housing (41) are connected to the side walls (12) of the crank case assembly (10). The mounting grooves (411) are respectively formed in the side walls of the cylinder housing (41), correspond to the mounting grooves (13) of the crank case assembly (10) and hold the first bearings (15) inside.

The piston channel (412) is formed in the cylinder housing (41) between the mounting grooves (411) and has an inner surface. The piston (31) of the piston assembly (30) is extended slidably into the piston channel (412) and the piston rings (32) are contacted with the inner surface of the piston channel (412). The cylinder head (42) is mounted over the cylinder housing (41) and is connected to the front end of the swing shaft (50).

In such an arrangement, when the crank assembly (20) rotate, the eccentricity h will make the crank case assembly (10) and the cylinder head assembly (40) vibrate in a certain amplitude. The vibration of the cylinder head assembly (40) is reciprocal and the vibration of the crank case assembly is rotational. The shaking and the vibration generated by the movement of the piston assembly (30) and the cylinder head assembly (40) can effectively be counterbalanced by a proper arrangement. The weight of the piston assembly (30) is assumed as $M_p$, the weight of the cylinder head assembly (40) is assumed as $M_h$, the stroke of the piston (31) to the connecting segments (222) is s and the eccentricity between the flange (221) and a corresponding connecting segment (222) is h. The inertia force of the cylinder head assembly (40) can be represent by $A(\theta)=M_h h \cos\theta$, the inertia force of the piston assembly (30) can be represent by $a(\theta)=(M_p s/2)\cos\theta$. Therefore, when the eccentricity h is $$-sM_p/2M_h,$$

the inertia force of the cylinder head assembly (40) is same as and is counteracted with the inertia force of the piston assembly (30), i.e. $A(\theta)=-a(\theta)$. The negative sign represents that the direction of the eccentricity is opposed to the direction of the distal end (342) of the piston rod (34).

Furthermore, the counterweight can be divided into two parts. The first part is adapted to balance the crank assembly (20). The second part or the additional part is adapted to balance the vibration of the crank case assembly (10). Assume the weight of the additional part is M, the eccentric distance of the additional part is r, the weight of the crank case assembly is B. If the weight of the counterweight blocks (23) M is equal to $-Bh/r$, then the rotating unbalance force of the crank assembly (20) will be the same as and be counteracted with the rotating unbalance force of the crank case assembly (10). The negative sign represents that the direction of the rotating unbalance force of the crank assembly (20) is opposed to the direction of the rotating unbalance force of the crank case assembly (10). In this case the negative sign reveals that the counterweight (23) is relatively smaller than the conventional piston engines.

In addition, the stroke of the piston (31) will increase to s+2h due to the eccentricity h.

To increase the efficiency of reducing the shaking and the vibration of the piston engine, the user can increase the weight of the cylinder head assembly (40) and decrease the weight of the crank case assembly (10) by means of putting an oil pump, a water pump or a starting motor onto the cylinder head (42).

Furthermore, the air in the piston channel (412) can be compressed by the piston (31) and is stored in a reservoir to make the piston engine to serve as a piston compressor.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A piston engine that mounted on a frame having a mounting bracket protruded out the frame, a gearbox mounted securely with the frame and having a holding bracket, and a swing shaft connecting the frame and the piston engine, and the piston engine comprising
    a crank assembly adapted to be mounted rotatably between the mounting bracket and the holding bracket and having
        a central axle having
            two connecting segments, one of the connecting segments adapted to be attached in the holding bracket and extended into the gearbox, and the other connecting segment adapted to be attached in the mounting bracket of the frame; and
            two flanges coaxial but eccentric mounted on the connecting segments respectively and one of the flanges abuts with the holding bracket and the other flange abuts with the mounting bracket of the frame and each flange having an eccentricity h with a corresponding connecting segment;
        two counterweight blocks mounted securely on the central axle and each having
            an outer surface abutting with one of the flanges; and
            an inner surface facing to each other; and
        a crank axle mounted transversely between the inner surfaces of the counterweight blocks;
    a piston assembly connected with the crank assembly and having
        a piston rod mounted on the crank axle and having
            a distal end mounted around the crank axle between the counterweight blocks; and
            a proximal end;
        a piston pin mounted transversely on the proximal end of the piston rod; and
        a piston mounted around the proximal end of the piston rod and attached securely to the piston pin;
    a crank case assembly attached with the crank assembly and having
        a body being U shaped, attached to the central axle of the crank assembly and having
            two side walls formed and protruded up from the body and parallel with each other;
            two mounting grooves being semicircular and respectively formed on the side walls, facing each other and respectively holding the flanges of the central axle inside; and
            a chamber formed between the side walls to hold the counterweight blocks inside; and
    a cylinder head assembly combined with the crank case assembly, adapted to be connected vertically with the swing shaft of the frame and having
        a cylinder housing combined with the body of the crank case assembly and having
            two side walls connected to the side walls of the crank case assembly;
            two mounting grooves respectively formed in the side walls of the cylinder housing, and corresponding respectively to the mounting grooves in the crank case assembly; and
            a piston channel formed in the cylinder housing between the mounting grooves and the piston of the piston assembly extended slidably into the piston channel; and
        a cylinder head mounted over the cylinder housing and adapted to be connected with the front end of the swing shaft.

2. The piston engine as claimed in claim 1, wherein
the piston is a sheath and has an outer surface; and
the piston assembly further has multiple piston rings separately mounted around the outer surface of the piston.

3. The piston engine as claimed in claim 1, wherein
the piston rod further has two mounting holes respectively formed through the distal end and the proximal end of the piston rod;
the crank axle extends through the mounting hole in the distal end of the piston rod; and
the piston pin extends through the mounting hole in the proximal end of the piston rod.

4. The piston engine as claimed in claim 1, wherein
the crank case assembly further has
    two first bearings respectively mounted around the flanges of the central axle and held in the mounting grooves in the body of the crank case assembly; and
    two second bearings respectively mounted around the connecting segments of the central axle, one of the second bearings adapted to be mounted in the mounting bracket of the frame and the other second bearing adapted to be mounted in the holding bracket of the gearbox.

5. The piston engine as claimed in claim 1, wherein
the eccentricity of h is equal to $$-sM_p/2M_h$$

make an inertia force of the cylinder head assembly be same as and counteracted with an inertia force of the piston assembly, wherein
    $M_p$ is a weight of the piston assembly;
    $M_h$ is a weight of the cylinder head assembly;
    s is a stroke of the piston and increased as s+2h; and
    the negative sign (−) represents that the direction of the eccentricity is opposed to the direction of the distal end of the piston rod.

6. The piston engine as claimed in claim 1, wherein
the counterweight blocks can be divided into two parts, one of the parts is adapted to balance the crank assembly and the other part is adapted to balance the vibration of the crank case assembly;

M is a weight of the other part;

r is a eccentric distance of the other part;

B is a weight of the crank assembly;

when M is equal to −Bh/r, the rotating unbalance force of the crank assembly will be same as and counteracted with the rotating unbalance force of the crank case assembly, wherein the negative sign (−) represents that the direction of the rotating unbalance force of the crank assembly is opposed to the direction of the rotating unbalance force of the crank case assembly.

7. The piston engine as claimed in claim 2, wherein the piston rod further has two mounting holes respectively formed through the distal end and the proximal end of the piston rod;

the crank axle extends through the mounting hole in the distal end of the piston rod; and the piston pin extends through the mounting hole in the proximal end of the piston rod.

8. The piston engine as claimed in claim 7, wherein the crank case assembly further has two first bearings respectively mounted around the flanges of the central axle and held in the mounting grooves in the body of the crank case assembly; and two second bearings respectively mounted around the connecting segments of the central axle, one of the second bearings adapted to be mounted in the mounting bracket of the frame and the other second bearing adapted to be mounted in the holding bracket of the gearbox.

9. The piston engine as claimed in claim 8, wherein the eccentricity of h is equal to $$-sM_p/2M_h$$

make an inertia force of the cylinder head assembly be same as and counteracted with an inertia force of the piston assembly, wherein $M_p$ is a weight of the piston assembly;

$M_h$, is a weight of the cylinder head assembly;

s is a stroke of the piston and increased as s+2h; and the negative sign (−) represents that the direction of the eccentricity is opposed to the direction of the distal end of the piston rod.

10. The piston engine as claimed in claim 9, wherein the counterweight blocks can be divided into two parts, one of the parts is adapted to balance the crank assembly and the other part is adapted to balance the vibration of the crank case assembly;

M is a weight of the other part;

r is a eccentric distance of the other part;

B is a weight of the crank assembly;

when M is equal to −Bh/r, the rotating unbalance force of the crank assembly will be same as and counteracted with the rotating unbalance force of the crank case assembly, wherein the negative sign (−) represents that the direction of the rotating unbalance force of the crank assembly is opposed to the direction of the rotating unbalance force of the crank case assembly.

\* \* \* \* \*